United States Patent [19]

Kreifels

[11] Patent Number: 4,891,788

[45] Date of Patent: Jan. 2, 1990

[54] FIFO WITH ALMOST FULL/ALMOST EMPTY FLAG

[76] Inventor: Gerard A. Kreifels, 7304 Amsterdam Ave., Citrus Heights, Calif. 95621

[21] Appl. No.: 378,451

[22] Filed: Jul. 11, 1989

Related U.S. Application Data

[63] Continuation of Ser. No. 191,555, May 9, 1988, abandoned.

[51] Int. Cl.[4] .............................................. G11C 15/00
[52] U.S. Cl. .................................. 365/49; 365/189.01; 365/230.05; 365/221; 365/230.08
[58] Field of Search ................. 365/49, 189, 221, 230, 365/189.01, 230.01, 189.12, 230.95, 230.08

[56] References Cited

U.S. PATENT DOCUMENTS

| | | | |
|---|---|---|---|
| 3,704,452 | 11/1972 | Beausoleil et al. | 365/221 |
| 3,708,690 | 1/1973 | Paivnen | 307/221 |
| 4,803,657 | 2/1989 | Giebel et al. | 365/221 |

*Primary Examiner*—Terrell W. Fears

[57] ABSTRACT

An almost full flag for a FIFO includes first and second counters for determining the proximity of the Read and Write pointers in the FIFO. A compare circuit is provided for comparing the output of the counters to determine when the count values are separated by a predetermined value. When the separation is equal to the predetermined value, the output of the comparitor goes low. A half flag is set when a Write operation occurs and the difference value between the Read and Write pointers increases. The set operation is performed in response to the presence of the compare signal at a low logic state at the time that the Write operation occurs, thus eliminating any delays in generating a transition in the compare circuit. The flag is reset when the compare signal is at the low logic state. Blanking circuitry is provided for blanking the reset operation when a Read operation occurs and the output of the comparator makes a transition from the first logic state to the second logic state. The blanking operation occurs for a predetermined duration of time to allow the counter to settle before performing the reset operation.

11 Claims, 8 Drawing Sheets

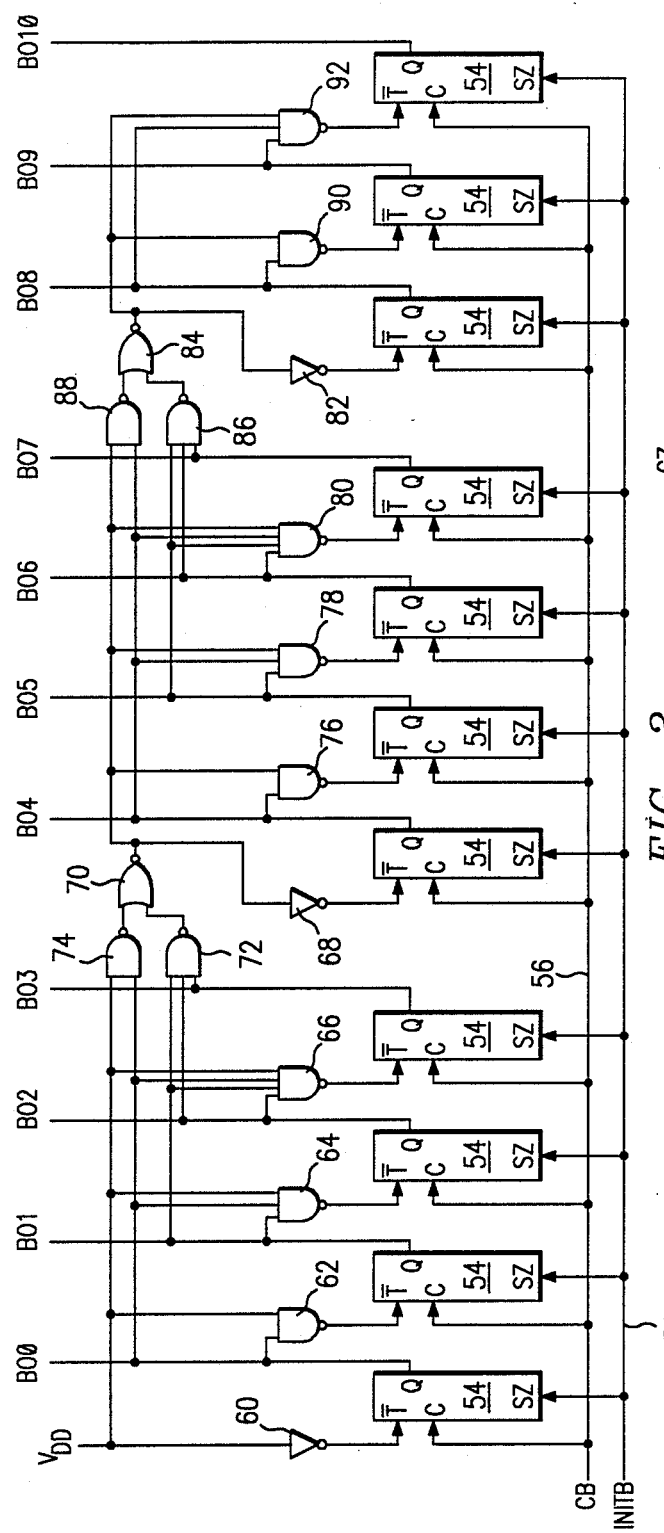
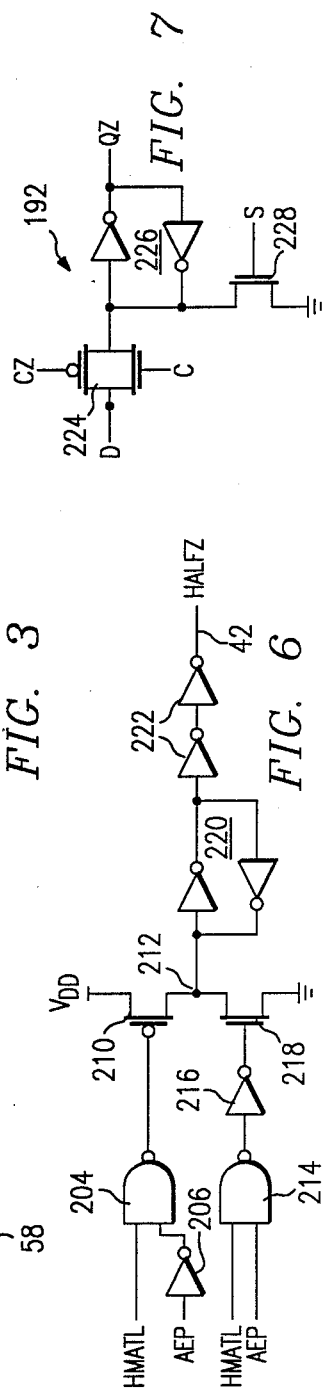
FIG. 3
FIG. 6
FIG. 7

FIFO WITH ALMOST FULL/ALMOST EMPTY FLAG

This is a continuation of co-pending application Ser. No. 191,555, filed on May 9, 1988, now abandoned.

TECHNICAL FIELD OF THE INVENTION

The present invention pertains in general to FIFOs and, more particularly, to the operation of the flags to determine the amount of information stored in the FIFO.

BACKGROUND OF THE INVENTION

First In First Out Memories (FIFOs) provide an important data buffer function for reading and writing operations between two discrete machines of widely differing operating frequency. FIFOs allow asynchronous operation between the two machines, wherein data can be simultaneously written to the FIFO and read therefrom. The heart of the FIFO is a dual-port memory that enables the Read and Write operations to be independent of each other, this allowing truly asynchronous operation of the input and the output.

The dual-port memory portion of the FIFO can be realized with a dual-port RAM cell that has a plurality of addressable locations. The Read and Write pointers are provided for generating the addresses of the addressable locations for the Read and Write operations, respectively. The Read and Write pointers are incremented for a Read and Write operation, respectively, instead of actually moving the data through a series of shift registers. However, it is important that the Read pointer and Write pointer do not point to the same address at the same time wherein information would be written into a memory location and read from the same memory location simultaneously. To prevent this happening, status flags are utilized to provide an indication to the user of the proximity of the two pointers.

The status flags are utilized on the Read side to indicate to the user that the FIFO is empty. In this manner, the user would not attempt to read a FIFO that is empty and, in fact, circuitry is provided to inhibit incrementing of the Read pointer to overtake the Write pointer address. In a similar manner, a full flag is provided to indicate to the user that the memory is full, such that the user will not attempt to write data to the memory or increment the pointer past the Read pointer. The full and empty status flags are conventional flags that are provided in FIFOs.

An additional flag that has been provided for FIFOs in the past is a half-full flag that indicates to the Write side of the FIFO that the FIFO is half-full and to the Read side of the FIFO that the FIFO is half-empty. However, this type of flag has some synchronization problems associated therewith, especially when utilized with asynchronous operation. For example, when data is being written into the memory at a location that will set the half-full flag to the half-full position, it is important to insure that a simultaneous Read operation does not result in a flag error wherein the flag is in the wrong state. Typically, a FIFO having 2048 registers would have the half-full flag set when data is written into the 1025th location.

To solve the problem of half-full flag errors, various FIFOs have required the use of external circuitry to insure that the Read and Write operations do not occur within a predetermined time. This typically requires a blanking circuit of some type between the Read port and the Write port to insure that the Read and/or Write operation is delayed with respect to the other. However, the main disadvantage to this is that a truly asynchronous operation is defeated and the Read and Write ports must be synchronized.

SUMMARY OF THE INVENTION

The present invention disclosed and claimed herein comprises an almost full flag for a FIFO. A Read pointer is provided for determining the location in the FIFO for reading information therefrom and a Write pointer is provided for determining the location in the FIFO for writing information thereto. The Read pointer is incremented for each Read operation and the Write pointer is incremented for each Write operation with the Write pointer having a higher value than the Read pointer. Counter circuitry is provided for determining the proximity of the Read pointer to the Write pointer. When the Read and Write pointer are separated by a predetermined distance that is less than full and greater than empty, a compare signal is generated at a first logic state. If the compare signal is not generated, the output of the counter circuitry is at a second logic state. When it is determined that the output of the counter circuitry is at a first logic state indicating the presence of the compare signal and the external write signal is received, a set signal is generated. A flag is then placed in a set position. When it is determined that the compare signal is next present, the flag is placed in a reset position.

In another aspect of the present invention, the counter circuitry has a predetermined settling time after changing states from the first logic state to the second logic state or from the second logic state to the first logic state. Blanking circuitry is provided for inhibiting generation of the reset signal until a predetermined duration of time after generation of the external Read signal. The external Read signal causes the compare signal to change from the second logic state to the first logic state.

In yet another aspect of the present invention, the counter circuitry has a predetermined settling time. The compare signal is latched onto one input of an AND circuit for a predetermined duration of time after receipt of the external Write signal. In addition, the other input of the AND gate is connected to a pulse having a width equal to the predetermined duration of time such that a set signal is generated only during that predetermined duration of time and is isolated from any change in the output of the counter circuit. Additionally, the reset operation is blanked during the predetermined duration of time.

BRIEF DESCRIPTION OF THE DRAWINGS

For a more complete understanding of the present invention and the advantages thereof, reference is now made to the following description taken in conjunction with the accompanying Drawings in which:

FIG. 3 illustrates a logic diagram of the counter;

FIG. 6 illustrates the output circuitry of the flag logic for setting and resetting the flag;

FIG. 7 illustrates a detailed logic diagram of the latch of FIG. 5; and

DETAILED DESCRIPTION OF THE INVENTION

Figure 1:
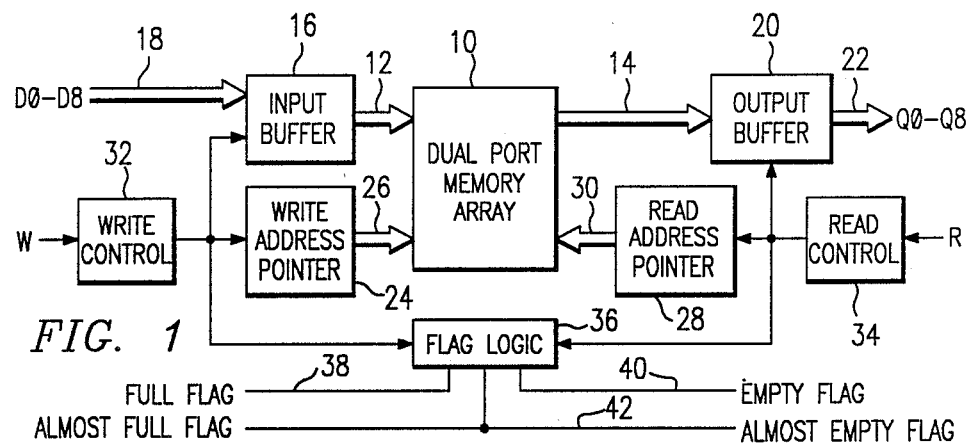
FIG. 1 illustrates a block diagram of the FIFO of the present invention.

Referring now to FIG. 1, there is illustrated a block diagram of the FIFO utilizing the almost full/almost empty flag of the present invention. The FIFO has a dual-port memory array 10 which has a data input port connected to a bus 12 and a data output port connected to a bus 14. The bus 12 is output from an input buffer 16 which is connected to input data D$\emptyset$-D8 on an input bus 18, and the bus 14 is input to an output buffer 20 which provides output data Q$\emptyset$-Q8 on an output bus 22. Although nine data bits are utilized, any number of data bits can be accomodated in accordance with the operation of the FIFO. The dual-port memory 10 is an array of addressable memory locations operable to be written to from the bus 12 and read out to the bus 14. However, it should be understood that any type of FIFO memory block, such as registers, etc., can be utilized in association with the present invention.

The memory array 10 has Write address input connected to a Write address pointer 24 through a bus 26. The Read address input is connected to the output of the Read address pointer 28 through a bus 30. The address pointers 24 and 28 are cyclical counters which are incremented by various control signals. The Write address pointer 24 is controlled by a Write control circuit 32 that is connected to a Write input signal and the Read address pointer 28 is controlled by a Read control circuit 34 that receives the Read input signal. By utilizing the cyclical counters, the next sequential address can be written to for each new data word input to the array 10 and the Read pointer 28 can be incremented to read out data stored at the next sequential address.

The output of the Write control circuit 32 is input to the input buffer 16, and also to a flag logic circuit 36, which also receives on an input thereof the. output of the Read control circuit 34. The output of the Read control circuit 34 is also input to the output buffer 20. The flag logic circuit 36 is operable to determine the proximity of the Write address pointer 24 and the Read address pointer 28 by internally counting each Write and Read operation and comparing the count values. A full flag is output on a line 38 when the Read pointer 28 and Write pointer 24 are at a maximum distance apart and an empty flag is output on a line 40 when the Read pointer 28 and the Write pointer 24 are equal. An almost full/almost empty flag is output on a line 42 to indicate a proximity in between empty and full. For purposes of the present invention, and by way of example only, this proximity is half-full. This flag is referred to as the half flag. The half-flag is therefore set when one register representing more fifty percent of the addressable locations in the array 10 is written to, which flag indicates to the Write side that the array 10 is half-full. It should be understood that the half flag can be set and reset at any proximity of the two pointers such as, for example, four bytes from empty or eight bytes from full.

Figure 2:
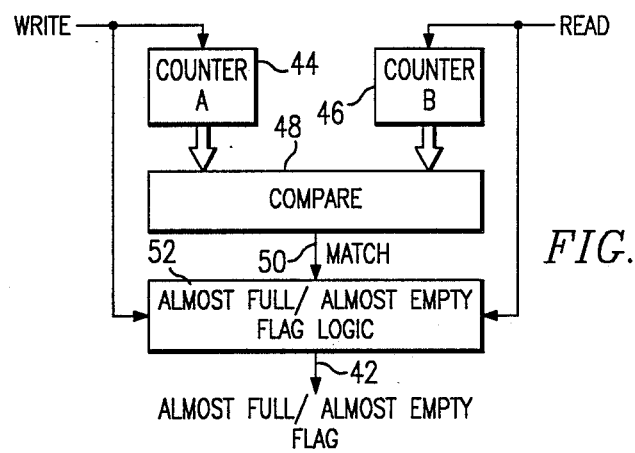
FIG. 2 illustrates a block diagram of the flag logic for generating the almost full flag.

Referring now to FIG. 2, there is illustrated a portion of the schematic block diagram of the flag logic circuit 36 including the portion thereof for generating the half flag on line 42. The generation of the full and empty flags on lines 38 and 40 is conventional and will not be described herein in detail. The output of the Write control circuit 32 is input to a counter 44 and the output of the Read control 34 is input to a counter 46. Counter 44 and counter 46 are cyclical counters which are continually incremented. The output of counters 44 and 46 are input to a compare circuit 48. The compare circuit 48 generates a match on an output line 50 whenever the counters are separated by a value of 1024. This represents a half-full status wherein the array 10 in the preferred embodiment has a maximum register value of 2048. This match signal is input to an almost full flag logic block 52, the output of which provides the half flag on line 42. The flag logic circuit 52 also receives the output of the Write control circuit 32 and the output of Read control circuit 34, and is generally operable to set the flag when it is determined that the count value has gone from 1024 to 1025 and to reset the flag when it is determined that the count value is at 1024. In addition, the flag logic circuit 52 prevents errors from occurring in the status of the half flag when the Read and Write operations occur proximate to the transition between the values 1024 and 1025 and even when the transitions are simultaneous, such that an error in the half flag cannot occur.

As will be described hereinbelow, the circuit generally operates by generating a narrow pulse off the edge of the Read signal and a narrow pulse off the edge of the Write signal. By utilizing these narrow pulses, problems with setting and resetting the flag can only occur when the pulses overlap, thus reducing the possibility of errors to a significant extent. the operation of these narrow pulses and the setting and resetting of the value will be described in detail with regard to the timing diagrams of FIGS. 8a-8j.

Referring now to FIG. 3, there is illustrated a logic diagram of a cyclic eleven-bit counter which makes up each of counters 44 and 46, both counters being identical. Each of the eleven bits is comprised of a D-type flip flop 54 with each of the flip flops 54 having the Q-output thereof providing one of the output bits BO$\emptyset$-BO1$\emptyset$. A second counter (not shown) would provide the values AO$\emptyset$-AO1$\emptyset$, this counter being identical to the counter illustrated in FIG. 3.

The counter is clocked by a clock signal on line 56 and a set input is connected to a reset signal INITB on line 58. The counters are initially set to a predetermined value and then the counter clock incremented to the values BO$\emptyset$-BO1$\emptyset$. The flip flop 54 associated with the bit BO$\emptyset$ has the data input thereof connected to $V_{DD}$ through an invertor 60. The data input for the flip flop 54 associated with the BO1 bit has the input thereof connected to the output of a NAND gate 62, one input of which is connected to the BO$\emptyset$ bit and the other input of which is connected to $V_{DD}$. The data input for the BO2 flip flop 54 is connected to the output of a three-input NAND gate 64, one input of which is connected to the BO1 bit, one input of which is connected to the BO$\emptyset$ bit and one input of which is connected to the $V_{DD}$. The BO3 flip flop 54 has the data input thereof connected to the output of a four-input NAND gate 66, one input of which is connected to the BO2 bit, one input of which is connected to the BO1 bit, one input of which is connected to the BO$\emptyset$ bit and one input of which is connected to $V_{DD}$.

The data input to the BO4 flip flop 54 is connected through an invertor 68 to the output of a NOR gate 70. NOR gate 70 has one input thereof connected to the output of a three-input NAND gate 72 and the other input thereof connected to the output of a two-input NAND gate 74. NAND gate 72 has one input thereof connected to the BO3 bit, one input thereof connected to the BO2 bit and one input thereof connected to the BO1 bit. NAND gate 74 has one input thereof connected to the BO0 bit and one input thereof connected to $V_{DD}$.

The BO5 flip flop 54 has the data input thereof connected to the output of a NAND gate 76, one input of which is connected to the BO4 bit and one input of which is connected to the output of NOR gate 70. The BO6 flip flop 54 has the data input thereof connected to the output of a three-input NAND gate 78, one input of which is connected to the BO5 bit, one input of which is connected to the BO4 bit and one input of which is connected to the output of NOR gate 70. The BO7 flip flop 54 has the data input thereof connected to a four-input NAND gate 80, one input of which is connected to the BO6 bit, one input of which is connected to the BO5 bit, one input of which is connected to the BO4 input and one input of which is connected to the output of NOR gate 70.

The data input to the BO8 flip flop 54 is connected through an invertor 82 to the output of a NOR gate 84. NOR gate 84 has one input thereof connected to the output of a three-input NAND gate 86 and one input thereof connected to the output of two-input NAND gate 88. NAND gate 86 has one input thereof connected to the BO7 bit, one input thereof connected to the BO6 bit and one input thereof connected to the BO5 bit. NAND gate 88 has one input thereof connected to the BO4 bit and one input thereof connected to the output of NOR gate 70. The BO9 flip flop 54 has the data input thereof connected to the output of a NAND gate 90, one input of which is connected to the BO8 bit and one input of which is connected to the output of NOR gate 84. The BO10 flip flop 54 has the data input thereof connected to the output of a three-input NAND gate 92, one input of which is connected to the BO9 bit, one input of which is connected to the BO8 bit and one input of which is connected to the output of NOR gate 84.

Figure 4:
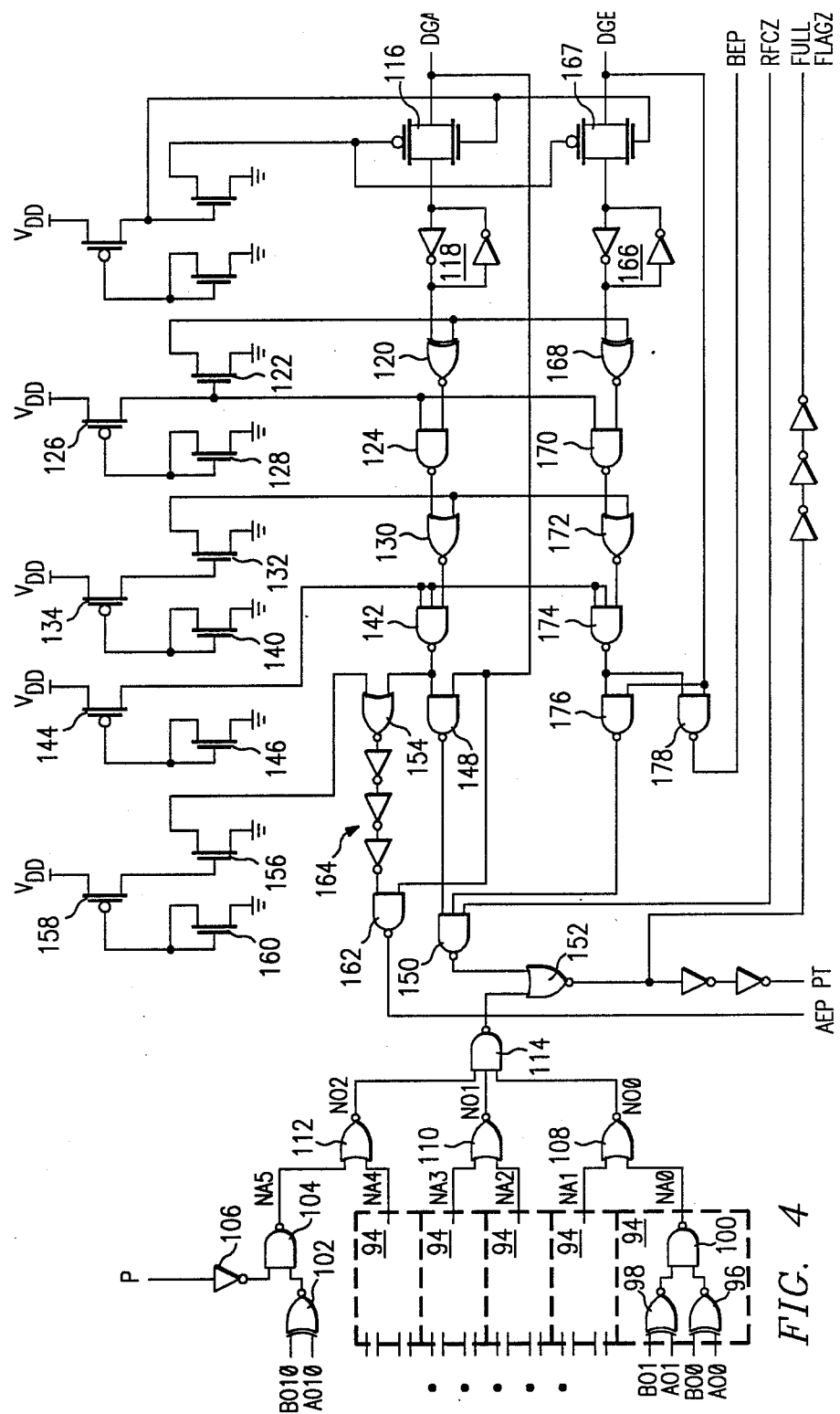
FIG. 4 illustrates a logic diagram of the pulse generation circuits for generating AEP and BEP.

Referring now to FIG. 4, there is illustrated a schematic diagram for generating low going pulses AEP and BEP for the flag logic 52 and also for generating the full flag. The compare operation for the flags is performed with logic NOR compare circuitry. The Exclusive NOR compare circuitry is comprised of a plurality of logic blocks 94. Each of the blocks 94 is comprised of two Exclusive NOR gates 96 and 98, the outputs of which are connected to the respective inputs of a two input NAND gate 100. The output of the NAND gate 100 provides the output from the block 94. Only the block 94 associated with counter bits AO0, BO0 and AO1, BO1 is illustrated in detail. For the illustrated block 94, the AO0, BO0 bits are input to respective inputs of Exclusive NOR gate 96 and the bits AO1 and BO1 are input to respective inputs of Exclusive NOR gate 98. The output thereof is labelled NA0. The blocks 94 are associated with bits AO0 and BO0 through AO9 and BO9, respectively. The bits AO10 and BO10 are input to a single Exclusive NOR gate 102, the output of which is input to one input of a NAND gate 104 to provide the output NA5. The other input of NAND gate 104 is connected through an invertor 106 to a signal P, which is low for normal operation.

The outputs NA0 and NA1 are input to respective inputs of a NOR gate 108, the outputs NA2 and NA3 are input to respective inputs of a NOR gate 110 and the outputs NA4 and NA5 are input to respective inputs of a NOR gate 112. The outputs of NOR gates 108-112 provide the signals NO0, NO1 and NO2 respectively. These outputs are input to the respective inputs of a three-input NAND gate 114, the output of which provides the compare signal for the full flag logic. For purposes of the compare circuit 48 of FIG. 2, select ones of the outputs NA0-NA5 and NO0-NO2 are utilized, as will be described with respect to FIG. 5.

The Write control input is received on a terminal DGA and is a positive going pulse. The DGA pulse is input to a CMOS transfer gate 116 which is input to a latch 118 configured with back-to-back invertors. The delay of gate 116 and latch 118 matches the delay from the signal CB to generation of BO0-BO10 in FIG. 3 for input to the circuitry of FIG. 5, described hereinbelow. The output of the latch 118 is connected to one input of an exclusive NOR gate 120, the other input of which is connected to ground through an N-channel transistor 122. The output of gate 120 is connected to one input of a NAND gate 124, the other input of which is connected to $V_{DD}$ through a P-channel transistor 126. The gate of the P-channel transistor 126 is connected to ground through an N-channel load transistor 128.

The output of NAND gate 124 is connected to one input of a NOR gate 130, the other input thereof connected to ground through the source/drain path of an N-channel transistor 132. The gate of transistor 132 is connected to $V_{DD}$ through the source/drain path of a P-channel transistor 134 which has the gate thereof connected to ground through an N-channel load transistor 140. The output of NOR gate 130 is connected to one input of a three-inputs NAND gate 142, the other input of which are connected to $V_{DD}$ through the source/drain path of a P-channel transistor 144, the gate of transistor 144 being connected to ground through a N-channel load transistor 146. The delay through gates 120, 124, 130 and 142 matches the delay through the compare circuit in each leg, for example, through gates 96, 100, 108 and 114 for one leg to generate CMP. The output of NAND gate 142 is connected to one input of a NAND gate 148, the other input of which is connected to the Write pulse DGA. The output of NAND gate 148 is connected to one input of a three input NAND gate 150, the output of which is connected to one input of a NOR gate 152. NOR gate 152 has the other input thereof connected to the output of NAND gate 114 to receive the compare output therefrom. The compare output of NAND gate 114 represents a comparison operation between the two counters with the output of NOR gate 152 providing the full flag indication. The operation of full flag will not be described in detail herein.

The output of NAND gate 142 is also input to one input of a NOR gate 154, the other input of which is connected to ground through an N-channel transistor 156, the gate of which is connected to $V_{DD}$ through the P-channel transistor 158. The gate of P-channel transistor 158 is connected to ground through an N-channel load transistor 160. NOR gate 154 has the output thereof connected to one input of a NAND gate 162 through three series connected invertors 164. Invertors 164 and NOR gate 154 provide an important delay function that matches the delay in subsequent circuitry. The other input of NAND gate 162 is connected to the Write pulse DGA, the output of NAND gate 162 also providing the AEP pulse utilized in flag logic 52.

The Read input is a negative going pulse input on a terminal DGB. The DGB pulse is input to a latch 166 through a CMOS gate 167. The delay through gate 167 and latch 166 matches the delay from the signal CB to generation of BO0- BO10 in FIG. 3. The latch 166 has the output thereof connected to one input of an Exclusive NOR gate 168, the other input thereof connected to ground through N-channel transistor 122. The output of gate 168 is connected to one input of a NAND gate 170, the other input of which is connected to $V_{DD}$ through transistor 126. The output of NAND gate 170 is connected to one input of a NOR gate 172, the other input of which is connected to ground through transistor 132. The output of gate 172 is connected to one input of a three-input NAND gate 174, the other two inputs of which are connected to $V_{DD}$ through transistor 144. The delay through gates 168, 170, 172 and 174 matches the delay from BO0- BO10 to generation of CMP.

The output of NAND gate 174 is connected to one input of a NAND gate 176, the other input of which is connected to the DGB pulse and the output of which is connected to one input of the NAND gate 150 to provide control signals for the full flag logic. The other input of NAND gate 150 is connected to an external signal RFCZ. In addition, the output of NAND gate 174 is connected to one input of a NAND gate 178, the other input of which is connected to the DGB pulse and the output of which provides the BEP output for the flag logic 52. It should be noted that the circuitry for generation of the AEP and BEP signals is identical with the exception of the additional delay provided by the NOR gate 154 and the three invertors 164. The circuitry for generating AEP and BEP provides two separate one-shot shot operations with a duration equal to the delay provided through the respective chain of invertors. In addition, the Read signal DGB is generated off the trailing edge of the Read pulse since it is a negative going pulse at the input to the transfer gate 167.

Figure 5:
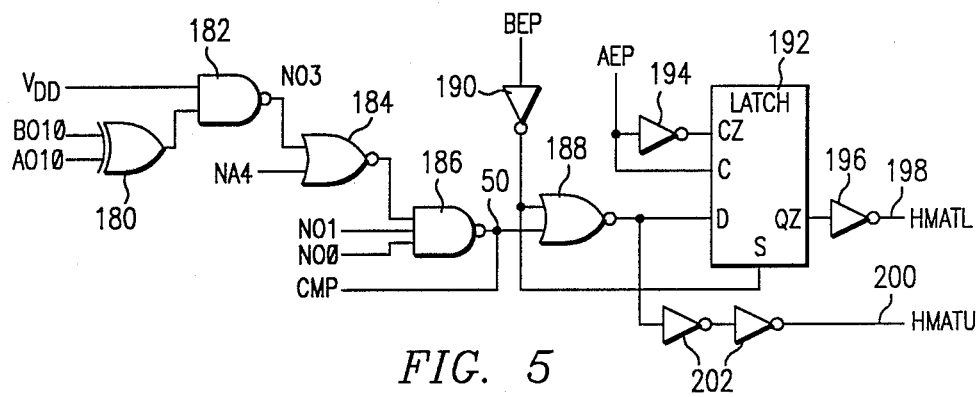
FIG. 5 illustrates a partial logic diagram of the flag logic.

Referring now to FIG. 5, there is illustrated a logic diagram of one portion of the almost full flag logic 52. The bits BO10 and AO10 are input to respective inputs of an Exclusive OR gate 180, the output of which is connected to one input of a NAND gate 182. The other input of the NAND gate 182 is connected to $V_{DD}$. The output of NAND gate 182 is connected to one input of a NOR gate 184, the other input of which is connected to the counter output NA4 for output by the Exclusive OR block 94 in FIG. 4. The output of NOR gate 184 is connected to one input of a three-input NAND gate 186, the other two inputs of which are connected to the signals NO1 and NO0 respectively, which are output by NOR gates 110 and 108, respectively, in the counter of FIG. 4. The NAND gate 186 provides the compare signal CMP which is utilized by the flag logic 52.

The CMP signal is input to one input of a NOR gate 188, the other input of which is connected to the BEP signal through an invertor 190. The CMP signal is an active low such that when a match exists, CMP is low. The signals NO0, NO1 and NO3 are selected from the two counters 44 and 46 to provide a match when the difference between the two counters 44 and 46 is equal to 1024. This represents the half-full status. However, it should be understood that any value could be selected for operation of the flag logic 52 of FIG. 2.

Since the CMP signal is active low, the output of NOR gate 188 will be a logic high when a match exists and BEP is high. When BEP is low or when there is no match, the output is a logic low. Therefore, the BEP signal provides a blanking operation during the BEP pulse, as will be described hereinbelow.

The output of NOR gate 188 is input to the data input of a latch 192. The clock input of the latch 192 is connected to the AEP signal and the clock-bar input thereof is connected to the AEP signal through an invertor 194. The set input thereof is connected to BEP and the Q-bar output thereof is connected through an invertor 196 to a terminal 198 to provide the HMATL signal. In addition, the output of NOR gate 188 is connected to a terminal 200 through two series connected invertors 202, to provide the HMATU signal. In operation of the circuit of FIG. 5, it can be seen that the HMATU signal will be high only when the separation between the two pointers is 1024 and BEP is high. Whenever BEP goes low, HMATU goes low to provide a blanking function, or, whenever the difference between the pointers is anything but 1024, HMATU will be low.

The latch 192 is a transparent latch whenever AEP is high and, whenever AEP is low, the value on the input thereof is latched to the terminal 198. The set input thereof is connected to the output of the invertor 190 to set the value on terminal 198 to a logic low whenever the BEP pulse is generated. Therefore, if AEP goes low during BEP, the output on terminal 198 will be latched low. However, if BEP is high and the difference is 1024, a logic high will be latched onto terminal 198 during AEP.

Referring now to FIG. 6, there is illustrated a logic diagram of the remaining portion of the flag logic 52 for interfacing with the logic circuitry of FIG. 5. The HMATL signal is input to one input of a NAND gate 204, the other input of which is connected through an invertor 206 to AEP. The output of NAND gate 204 drives the gate of a P-channel transistor 210, the source of which is connected to $V_{DD}$ and the drain of which is connected to an output node 212. The HMATU signal is connected to one input of a NAND gate 214, the other input of which is connected to AEP. The output of NAND gate 214 is connected through an invertor 216 to the gate of an N-channel transistor 218. N-channel transistor 218 has the drain thereof connected to node 212 and the source thereof connected to ground. Node 212 is connected to the input of a back-to-back invertor latch 220 which provides the almost empty/almost full flag labelled HALFZ on line 42 through two serially connected invertors 222.

The HMATL signal, in conjunction with the AEP signal, functions to set the half flag by pulling node 212 high through P-channel transistor 210. Therefore, when HMATL is high and AEP is low during the AEP pulse, the half flag is set. In addition, when setting the flag, AEP blanks operation of NAND gate 214 such that N-channel transistor 218 does not conduct. However, when HMATL is low and AEP is high, HMATU is operable to reset the flag. This only occurs when the CMP signal is low representing a difference value of 1024, and after the BEP pulse has been generated at the trailing edge thereof.

Referring now to FIG. 7, there is illustrated a schematic block diagram of the latch 192 of FIG. 5. The latch 192 has the D-input thereof connected through a CMOS transfer gate 224 to the input of a back-to-back invertor type latch 226. The output of latch 226 provides the Q-bar output. The input of latch 226 is also connected to the drain of an N-channel transistor 228, the source of which is connected to ground and the gate of which is connected to the set input, which set input is also connected to BEP through invertor 190. The transfer gate 224 is controlled by the clock and clock-bar inputs such that when the clock input connected to AEP is high, transfer gate 224 conducts, and when AEP is low, transfer gate 224 is in a blocking state.

Referring now to FIGS. 8a–8j, there are illustrated timing diagrams showing various operations wherein a Write operation and a Read operation occur close in time during the period of setting or resetting the half flag for the almost empty/almost full status. With specific reference to FIG. 8a, the Write input control signal is represented as a negative going pulse and the Read input control signal is also represented by a negative going pulse. The AEP pulse is a normally high signal which is triggered low in response to generation of the falling edge of the Write control signal width. This negative going pulse has a predetermined pulse width previously disclosed in FIG. 4. Although the AEP negative going pulse is illustrated as occurring simultaneously with the edge of the Write pulse, it is actually delayed therefrom, as will be described hereinbelow. In a similar manner, the BEP signal is a normally high signal which has a negative going pulse generated off of the rising edge of the Read pulse and is delayed therefrom. The BEP negative going pulse has a pulse width that is less than the pulse width of the AEP pulse, as will be described hereinbelow.

Figure 8A:
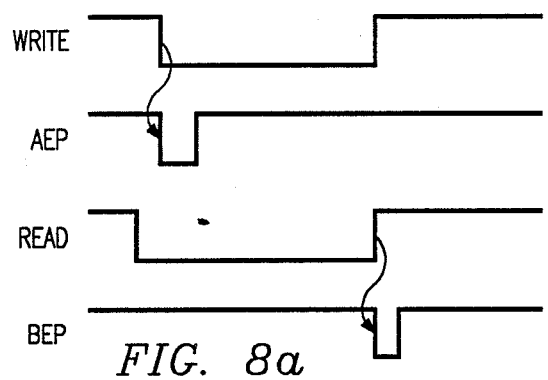
FIGS. 8a-8j illustrate timing diagrams for the operation of the flag logic.
Figure 8B:
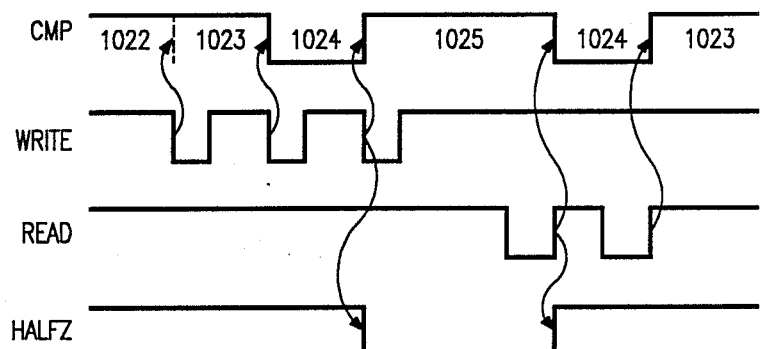

With reference to FIG. 8b, the CMP signal output by NAND gate 186 is normally high for all difference values of the two counters 44 and 46, except for the value 1024. When the difference value is 1024, the CMP signal is low. During normal operation where the difference value is less than 1024, the half flag HALFZ remains high, but the difference value is incremented for each Write operation. This difference value is the result of counter 44 being incremented and counter 46 not being incremented.

As illustrated by way of example in FIG. 8b, the initial difference value is 1022 until the first Write operation, wherein the counter is incremented to a value of 1023 on the falling edge of Write. Upon the next Write operation, the difference value is incremented to 1024 and CMP goes low. At the next Write operation, representing a transition from 1024 to 1025, HALFZ goes low. HALFZ will remain low until a Read Operation is performed. On the trailing edge of a Read pulse, the difference value is decremented from 1025 to 1024. This also results in CMP going low and HALFZ going high. Upon the next sequential Read operation with no Write operation, the difference value is again decremented to 1023 and the CMP signal goes high. This is a result of counter 46 being incremented without incrementing counter 44. Since the Write and Read operations give rise to the generation of the AEP and BEP pulses, respectively, further description of the timing operations will be described with reference only to the AEP and BEP pulses. However, the difference value and CMP are updated by the falling edge of a Write operation or the rising edge of a Read operation and not by AEP or BEP.

Figure 8C:
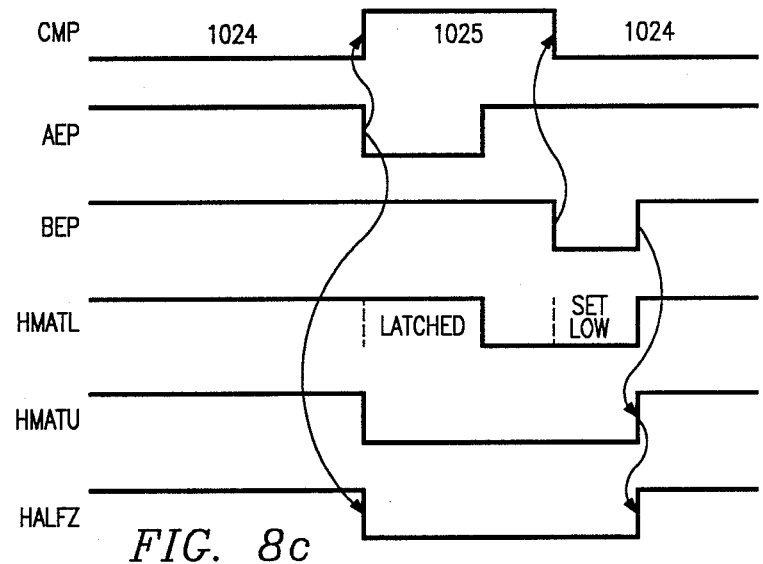

FIG. 8c illustrates the case where CMP is initially set low as a result of a difference value of 1024 being present. This can be the result of either a Read operation resetting the half flag or a Write operation changing the difference value from 1023 to 1024. FIG. 8c illustrates the case where a Write operation occurs before a Read operation and there is no overlapping.

When the Write operation occurs with CMP low, AEP goes low and raises CMP high as the difference changes from 1024 to 1025. This also results in the flag being set to a low indicating an almost full condition. The output signal HMATL is high as a result of the latch 192 latching the high output on NOR gate 188 to the HMATL terminal 198. The output of NOR gate 188 is high since the CMP signal was initially low and BEP was initially high. This value is latched to HMATL when AEP goes low. HMATU goes low when CMP goes high regardless of the state of BEP. BEP remains high during AEP and falls during a Read operation after AEP goes high. The falling edge of BEP coincides with the change in the difference value from 1025 to 1024, which causes CMP to go low. HMATL goes low when AEP goes high and while CMP is high, since latch 192 again becomes transparent. This value is maintained low during BEP, since the output of NOR gate 188 is low and the latch 192 is forced to a low logic state by BEP as a result of pulling down the input to the internal latch 226 in latch 192. At the end of BEP on the rising edge thereof, HMATU goes high, resulting in the flag HALFZ going high for a reset operation.

In operation, there are two functions that are achieved. The first is setting the flag and the second is resetting the flag. The operation of setting the flag is performed by determining that the count value has changed from 1024 to 1025. Therefore, some transition must be examined in order to determine this change. The decision is made by the fact that when AEP falls, it is known that the count value has been incremented since this coincides with the Write operation. Therefore, it is only necessary to know both that the previous count value was 1024 and that the falling edge of AEP has occurred. This would coincide with the count value being incremented to 1025. Therefore, the logic circuitry does not examine a change in CMP but, rather, it examines whether CMP was low, corresponding to a value of 1024, prior to AEP going low. Therefore, the set occurs on the falling edge of AEP.

In the set operation, it is important to insure that a reset does not inadvertently occur. The only way that the reset can occur is if for some reason the CMP signal went low for a very short duration of time. However, during AEP, the latch 192 is latched such that any change on the data input thereof is not reflected on the output thereof. This could occur as a result of the operation of the counters 44 and 46. During changes of states in the counter, some flip flops are slower than others, resulting in "glitches" which could inadvertently cause CMP to go low for a very short duration of time. Although illustrated as occurring simultaneously with the falling edge of AEP, the rising edge of CMP from the value of 1024 to 1025 occurs a short time after AEP goes low. Any potential glitches indicating a reset operation would occur around this falling edge. AEP prevents any operation related to CMP from being transferred through the circuitry to HMATL and, as such, AEP prevents these glitches from causing inadvertent resets. This is important when considering the occurrence of AEP when the count value is much less than 1024 wherein the half flag would not be set. If a glitch occurred in CMP which would appear as a transition from 1024 to 1025, the glitch would be blanked. The only condition that would result in a set operation is the existence of a low on the comparator output CMP or the occurrence of the low going edge of AEP. Therefore, the set operation is isolated from any glitches that occur as a result of the comparator operation and the operation of the counters. The decision is based solely upon the occurrence of the falling edge of AEP and the previous existence of the difference value 1024.

The operation for setting the flag is to be compared with the operation of resetting the flag. When resetting the flag, it is necessary to examine the transition of CMP to determine that it changed from a value of 1025 to a value of 1024. However, this transition is not examined until the end of BEP. At the end of BEP, any inadvertent glitches will have occurred and the counter settled to the correct value. For example, if the difference value varied from 1027 to 1026 during the Read operation, any glitches that would occur would occur around this transition. However, BEP blanks any potential reset operation until the rising edge thereof. This provides a predetermined amount of time for the counters to settle. Therefore, the reset operation is a function of the half-flag being set, the occurrence of the falling edge of CMP and the fact that the difference value corresponding to the CMP signal is equal to 1024 on the rising edge of BEP.

Figure 8D:
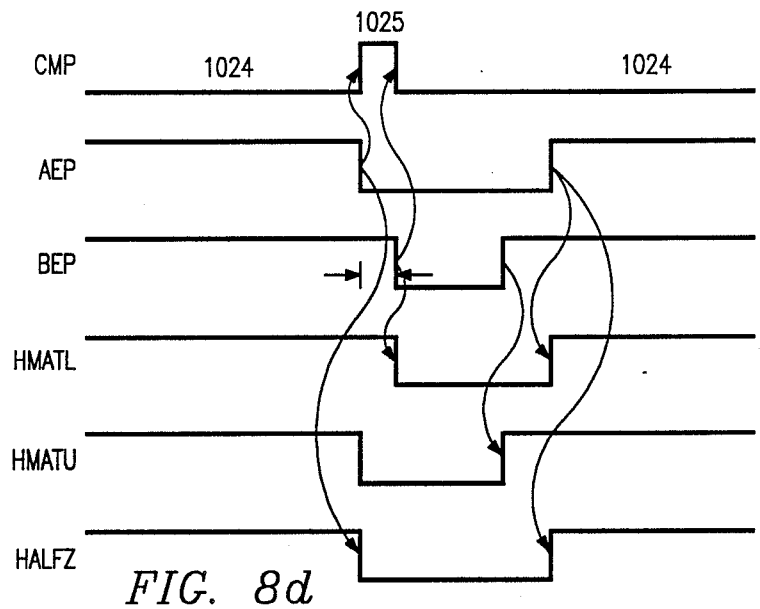

FIG. 8d illustrates the case where the falling edge of AEP occurs just prior to the falling edge of BEP. When AEP goes low during a difference of 1024, CMP goes high since the difference is incremented to 1025. This also results in HMATL being latched in a high condition. The rising edge of CMP causes HMATU to go low and the falling edge of AEP causes HALFZ to go low. This effectively sets the flag. When the falling edge of BEP occurs, the difference value is decremented from 1025 to 1024, causing CMP to go low. The period in which CMP is high can be very short. However, HMATU remains low since BEP blanks HMATU and keeps it low until BEP goes back high on the rising edge thereof. This results in a logic high on the input to NAND gate 214. However, if the rising edge of BEP occurs before the rising edge of AEP, that is, the BEP pulse occurs totally within the AEP pulse, AEP blanks NAND gate 214 and prevents resetting of the flag. The flag is reset to a high on the rising edge of AEP allowing NAND gate 214 to go low on the output thereof and turn transistor 218 on. However, if the rising edge of BEP occurred after the rising edge of AEP, the flag would be reset on the rising edge of BEP. Therefore, the width of the AEP pulse provides a minimum time after setting of the half flag during which a reset cannot occur. This is due to the fact that a high logic state is latched on the HMATL output until BEP goes low, pulling the input of the latch 226 low. The time between the falling edge of AEP and the falling edge of BEP results in the half flag being set to a low logic state. The half flag cannot be reset until the rising edge of AEP, which edge occurs after the rising edge of BEP. In this condition, AEP controls the setting of the half flag with the later occurrence of BEP causing CMP to go low and the pulse width of AEP providing a minimum duration of time between setting and resetting of the hal flag.

Figure 8E:
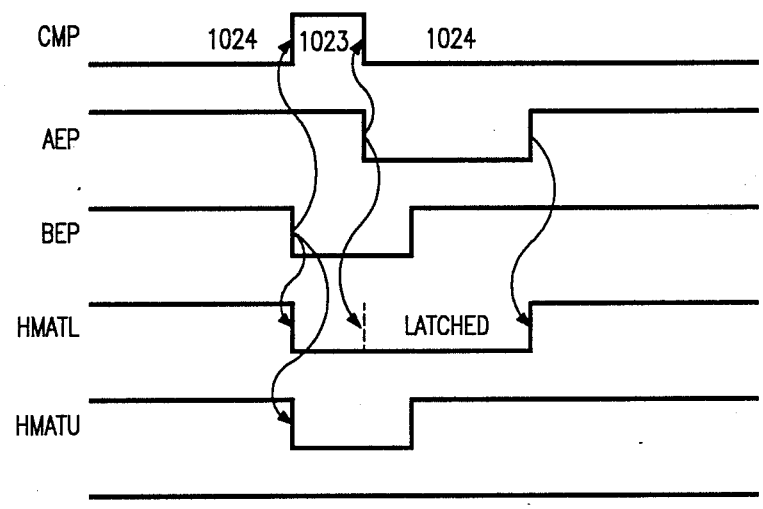

FIG. 8e illustrates the case where the falling edge of BEP occurs just prior to the falling edge of AEP and the difference value is 1024. This indicates the situation where the flag is in a reset state and the difference value changes from 1024 to 1023. Therefore, at the falling edge of BEP, CMP goes high indicating a difference value of 1023. Simultaneously, HMATL goes low since BEP forces the output thereof to a low state. In addition, HMATU also goes low since, as described above, BEP provides a blanking function to present reset during the time that BEP is low.

When the falling edge of AEP occurs, the difference value is incremented from 1023 to 1024 and CMP goes low. In addition, the value on the input to the latch 192 is latched on the output thereof. In the example of FIG. 8e, the falling edge of AEP occurs before the rising edge of BEP, and as such, HMATL is latched low. HMATL remains latched low until the rising edge of AEP. It is important to note that when the leading edge of AEP causes CMP to go low, HMATL is always latched to a low state, since that was the value output by the NOR gate 188 at the moment of latching. The only way that a set operation can occur is if the falling edge of AEP occurs when HMATL is a logic high. This must occur before the falling edge of BEP.

Figure 8F:
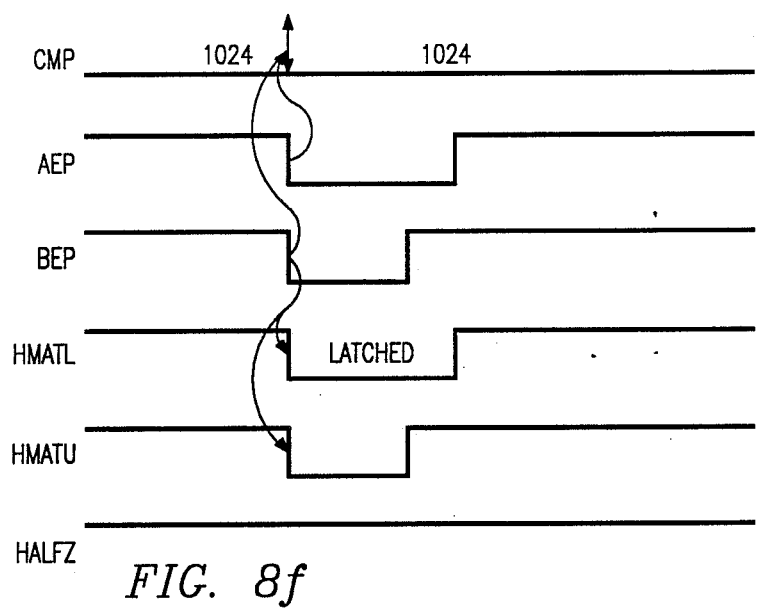

FIG. 8f describes the case where the falling edges of AEP and BEP occur simultaneously, and the difference value prior to the occurrence of these falling edges is 1024. At the falling edge of AEP and the falling edge of BEP, the difference value will still be 1024. Therefore, CMP remains low both prior to and after the falling edges thereof. Since BEP goes low, the value of HMATL is forced to a low and this low state is latched in the latch 192. Further, HMATU is also forced to a low on the falling edge of BEP. Therefore, the flag stays in the reset state at a logic high. The only way that the flag could be set to a low state is if the falling edge of AEP occurred just prior to the falling edge of BEP and the high logic state was latched onto HMATL. However, if this did occur, the flag would be reset at the end of AEP, as illustrated in FIG. 8d.

Figure 8G:
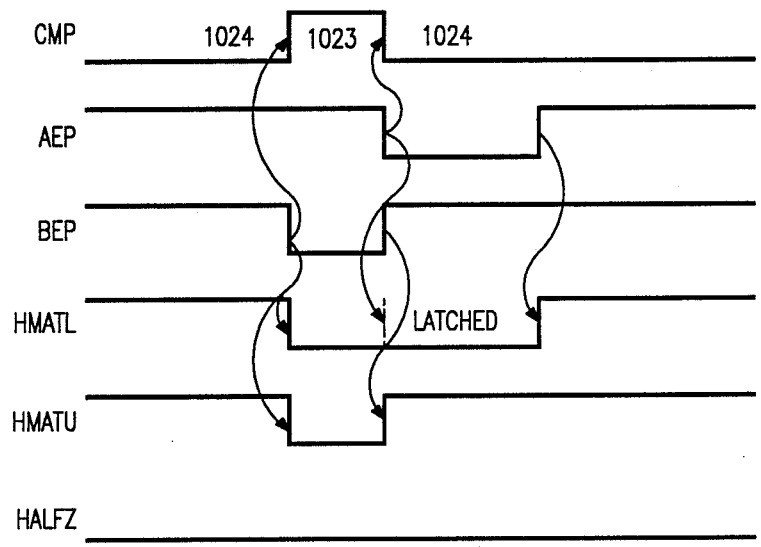

The timing diagram of FIG. 8g illustrates the case where the falling edge of AEP occurs simultaneous with the rising edge of BEP, where the difference value was 1024 prior to the falling edge of BEP. When BEP goes low, the difference value changes to 1023 and CMP goes high. In addition, HMATL is forced low and HMATU is forced low. The falling edge of AEP causes CMP to go low, since the difference value is now 1024. The rising edge of BEP occurs concurrently, and the combination of CMP low and BEP high causes HMATU to go high. The falling edge of AEP also latches the low state previously on HMATL for the duration of AEP. HMATL goes high on the rising edge of AEP. Therefore, the flag is not set to a low logic state.

Figure 8H:
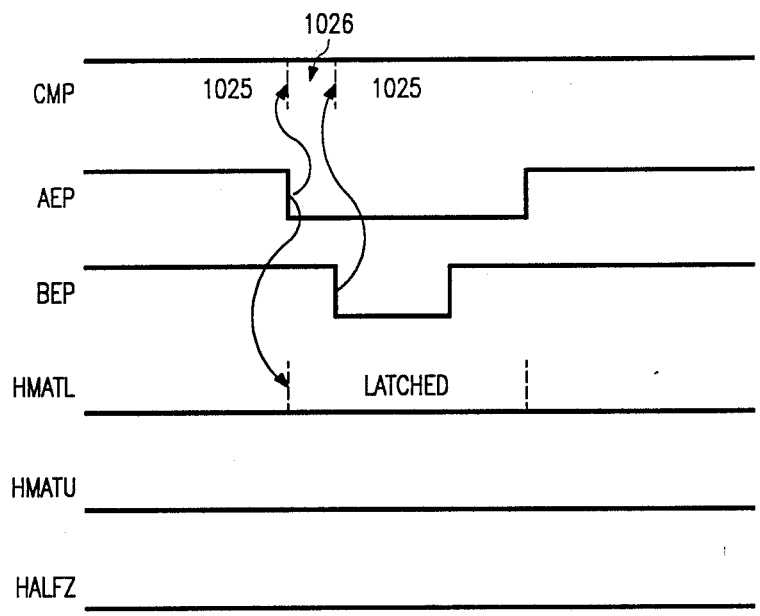
Figure 8I:
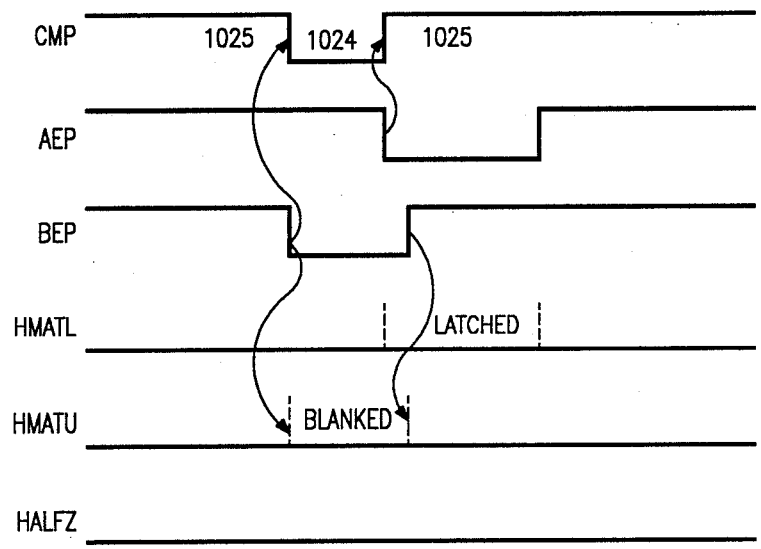
Figure 8J:
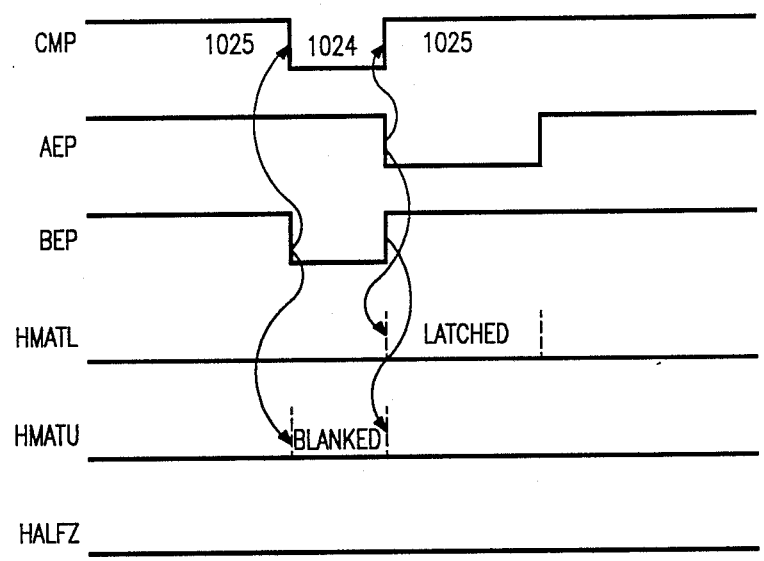

FIGS. 8h–8j illustrate the condition wherein the flag is initially set low indicating an almost full state and a Read and a Write operation occur in close proximity. FIG. 8h illustrates the case where AEP occurs just prior to BEP. Initially, the difference value is 1025 and this difference value changes to 1026 on the falling edge of AEP. HMATL is low when the difference value is 1025 and this value is latched in latch 192 on the falling edge of AEP. When the falling edge of BEP occurs, the difference value changes to 1025 but CMP remains high. Therefore, nothing occurs to change the state of HMATL or HMATU which always remain low and, therefore, the half flag can never be reset. As described above, the half flag is reset after occurrence of the rising edge of AEP and if HMATU is high at that time. Since CMP never goes low, HMATU will always remain low. The only way for HMATU to go low is for the falling edge of BEP to occur just prior to the falling edge of AEP.

FIG. 8i illustrates the case where the falling edge of BEP occurs just prior to the falling edge of AEP. When the falling edge of BEP occurs, the difference value changes from 1025 to 1024 and CMP goes low. However, during this time, HMATU is forced low since BEP goes low, which, as described above, is a portion of the blanking function of the BEP pulse. When the falling edge of AEP occurs, the difference value changes from 1024 to 1025 and HMATL is latched to a low condition. The reason that HMATL is latched to a low condition is that BEP forces HMATL to a low during the time in which BEP is low. Since the falling edge of AEP occurs before the rising edge of BEP, the half flag cannot be reset. This would require CMP to be low after the rising edge of BEP. However, if the falling edge of AEP occurred after the rising edge of BEP, the half flag would be reset to a high, but the subsequent rising edge of AEP would set the half flag back to a low state. In this case, HMATU would go high at the rising edge of BEP and then a logic high would be latched onto HMATL during AEP.

FIG. 8j illustrates the case where the falling edge of AEP occurs simultaneous with the rising edge of BEP when the half flag is set low, indicating an almost full condition. In this state, the falling edge of BEP changes the difference value from 1025 to 1024 and CMP goes low. In addition, HMATU is forced to a low as a result of the blanking function of BEP until the rising edge thereof. HMATL is forced low from the falling edge of BEP until the rising edge thereof. This results in AEP latching the low state onto HMATL on the rising edge thereof, which also causes CMP to go high and also prevents resetting of the flags since the flag cannot be reset during AEP. If the falling edge of AEP occurred just after the rising edge of BEP, HMATU would go high and reset the flag. However, as soon as the rising edge of AEP occurred, a logic high would be latched into HMATL and the flag would be reset. It is important for this operation that both HMATU be low and that AEP blank the reset function.

From the above operation, it can be seen that the setting/resetting of the flag occurs when a difference value between the pointers changes from a first predetermined value to the next and second predetermined value. This can be an increase in value or a decrease in value. The flag is set when it is determined that there has been an increase from the first value, and the flag is reset when it is determined that there has been a decrease to the first value. An increase in value from the initial value is determined by first making the decision that the first value is present and then making a determination that there has been an increase. This is done with the use of AEP where AEP in and of itself indicates an increase in value and the only information that is required to set the flag is whether the first value was present prior to the occurrence of the leading edge of AEP. During setting of the flag, it is important to blank out circuit operations so that no internal circuit glitches occur. Therefore, AEP blanks out any possible reset operation and any glitches due to the operation of the comparator. Since a comparator transition could occur every time AEP is generated or every time a Write operation occurs, AEP provides this blanking function every time the difference value is incremented. On the other hand, the reset operation occurs whenever there is a decrease in the difference value from the second value to the first value and this decision is made in that a reset operation occurs by the mere existence of the first value. Of course, the first value, which in the preferred embodiment is 1024, is present for a much longer duration of time, i.e. 50 nanoseconds, as compared to the amount of time required to make a decision for a reset operation. The reset operation does provide a blanking operation that both stops any reset operation that was previously occurring and also provides a predetermined amount of delay to insure that the counters and the comparator have settled before making this decision.

The blanking function of BEP in the circuit of FIG. 6 illustrates the timing relationship between the reset and set operations. In the set operation, AEP blanks any possible occurrence of reset to determine if HMATL is high. For example, during this period, any operation with respect to the comparator and BEP is blanked to prevent a potential high-going glitch from turning on transistor 218. For this purpose, AEP has a pulse width that is slightly longer than BEP. This is such that the pulse width of AEP corresponds to the duration of time that HMATU would be blanked by BEP. Since this blanking operation has three invertors 190, 202 and a NOR gate 188 introduced into the chain and AEP is input directly to NAND gate 214, the NOR gate 154 and three invertors 164 compensate for this delay. However, it is important to insure that the reset operation is blanked for the full duration of AEP and that HMATU does not cause a reset operation to occur. In a similar manner, BEP is operable to blank the reset operation by blanking HMATU during BEP and also to stop any ongoing reset operation.

Although the preferred embodiment has been described in detail, it should be understood that various changes, substitutions and alterations can be made therein without departing from the spirit and scope of the invention as defined by the appended claims.

What is claimed is:
1. An almost full flag for a FIFO, comprising:
a Read pointer for determining the location in the FIFO for reading information therefrom and for being incremented for each Read operation in response to application of an external Read signal;
a Write pointer for determining the location in the FIFO for writing information thereto and for being incremented for each Write operation in response to application of an external Write signal;
counter means for determining the proximity of said Read and Write pointer and outputting a compare signal when said Read and Write pointers have a predetermined difference therebetween, said counter means making a transition from a first logic state to a second logic state when said compare signal is generated;
set means for determining when the output of said counter means changes from said second logic state to said first logic state in response to the proximity of said Read and Write pointers changing as a result of application of said external Write signal;
reset means for determining when said compare signal is present and generating a reset signal in response thereto; and
an almost full flag having a set position and reset position, said almost full flag for being placed in the set position in response to generation of said set signal and for being placed in the reset position in response to generation of said reset signal.

2. The almost full flag of claim 1 wherein said counter means has a predetermined settling time when making a transition from said first logic state to said second logic state, and from said second logic state to said first logic state and further comprising:
first blanking means for preventing generation of said set signal for a predetermined duration of time after receipt of said external Write signal to allow said counter means to settle such that said predetermined duration of time is longer than said settling time; and
second blanking means for preventing the generation of said reset signal for a second predetermined duration of time after receipt of said external Read signal to allow said counter means to settle, said second predetermined duration of time longer than said predetermined settling time.

3. The almost full flag of claim 1 wherein said set means comprises means for determining if said compare signal is present when said external Write signal is received and generating said set signal in response thereto, such that said set signal is generated independent of said counter means having the output changed from said second logic state to said first logic state.

4. The almost full flag of claim 3 further comprising means for inhibiting generation of said reset signal for a predetermined duration of time after receipt of said external Read signal.

5. The almost full flag of claim 1 further comprising means for inhibiting generation said reset signal for a predetermined duration of time after receipt of said external Read signal.

6. An almost full flag for a FIFO, comprising:
a Read pointer for determining the location in the FIFO for reading information therefrom and for being incremented for each Read operation in response to receiving an external Read signal;
a Write pointer for determining the location in the FIFO for writing information thereto and for being incremented for each Write operation in response to receiving an external Write signal;
a first counter for being incremented in response to receipt of said external Read signal and having a first count value corresponding to the value of said Read pointer;
a second counter for being incremented in response to receipt of said external Write signal and having a second count value corresponding to the value of said Write pointer such that the difference in the value of said first and second count values corresponds to the proximity of said Read and Write pointers;
a compare circuit for comparing said first value with the second value and outputting a compare signal state when said first and second count values have a predetermined difference therebetween, said compare signal represented by a first logic state and the output of said compare means being at a second logic state when said compare signal is not generated;
set means for generating a set signal in response to the presence of said compare signal when said external Write signal is received;
reset means for generating a reset signal in response to the presence of said compare signal;
blanking means for inhibiting generation of said reset signal by said reset means for a predetermined duration of time after receipt of said external Read signal to prevent said reset signal from being generated proximate to the output of said compare circuit making a transition from said first logic state to said second logic state; and
a flag for being placed in a set position when said set signal is generated and for being placed in a reset position in response to generation of said reset signal.

7. The almost full flag of claim 6 wherein said set means comprises:
a latch having a data input connected to the output of said compare circuit and operable to latch the logic state on the output of said compare circuit to the output of said latch in response to receipt of said external Write signal;
an AND gate having first and second inputs and an output and operable to perform an AND logic function;
pulse generation means for generating a Write pulse having a pulse width of a second predetermined duration of time and generated in response to receipt of said external Write signal, said Write pulse input to one input of said AND gate and said Write pulse operable to control said latch to latch the logic state on the output of said compare circuit to the other input of said AND gate;
the output of said AND gate comprising said reset signal which is generated only during the pulse width of said Write pulse and in response to the output of said compare circuit being at the first logic state at the beginning of said Write pulse.

8. The almost full flag of claim 7 wherein generation of said reset signal is inhibited during said Write pulse.

9. The almost full flag of claim 6 wherein said compare circuitry and said first and second counters have a predetermined settling time in making a transition between said first and second logic states and wherein said predetermined duration of time of said blanking means exceeds said settling time.

10. A method for indicating an almost full condition for a FIFO, comprising:
providing a Read pointer that determines the location of the FIFO for reading information therefrom, the Read pointer incremented for each Read operation in response to receiving an external Read signal;
providing a Write pointer for determining the location in the FIFO for writing information thereto, the Write pointer being incremented for each Write operation in response to receiving an external Write signal;
determining the difference between the Read and Write pointers and controlling a compare signal to make a change from a first logic state to a second logic state when the difference equals a predetermined proximity value and for changing from the second logic state to the first logic state when the proximity changes from the predetermined proximity value;
generating a set signal in response to the compare signal being at the second logic state when the external Write signal is received;
generating a reset signal in response to the compare signal being at the second logic state;
inhibiting generation of the reset signal for a predetermined duration of time after receipt of the external Read signal to prevent the reset signal from being generated when the compare signal makes a transition from the first logic state to the second logic state; and placing a flag in a set position when the set signal is generated and replacing the flag in the reset position in response to generation of the reset signal.

11. The method of claim 10 wherein the step of determining the proximity value comprises:

incrementing a first counter in response to receipt of the external Read signal, the first counter having a first count value corresponding to the value of the Read pointer;

incrementing a second counter in response to receipt of the external Write signal, the second counter having a second count value corresponding to the value of the Write pointer; and comparing the first and second count values and outputting the compare signal at the second logic state when the proximity of the Read and Write pointers is equal to the predetermined proximity value.

* * * * *

UNITED STATES PATENT AND TRADEMARK OFFICE
CERTIFICATE OF CORRECTION

PATENT NO. : 4,891,788

DATED : January 2, 1990

INVENTOR(S) : Gerard A. Kreifels

It is certified that error appears in the above-identified patent and that said Letters Patent is hereby corrected as shown below:

On the title page, after

" [76] Inventor: Gerard A. Kreifels, 7304 Amsterdam Ave.,
            Citrus Heights, Calif. 95621"

insert

-- [73] Assignee: SGS-Thomson Microelectronics, Inc.,
            Carrollton, Tex. --

Signed and Sealed this

Seventeenth Day of March, 1992

Attest:

HARRY F. MANBECK, JR.

*Attesting Officer*  *Commissioner of Patents and Trademarks*